Dec. 31, 1963   A. H. RICH   3,116,472
MULTICHANNEL LOGERITHMIC INTEGRATING COMPUTER
Filed Jan. 31, 1961   3 Sheets-Sheet 1
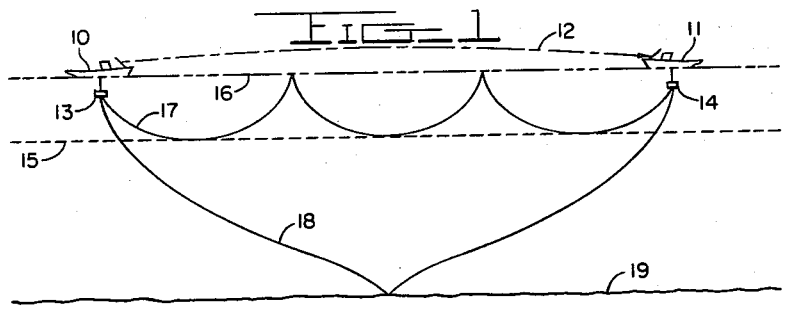
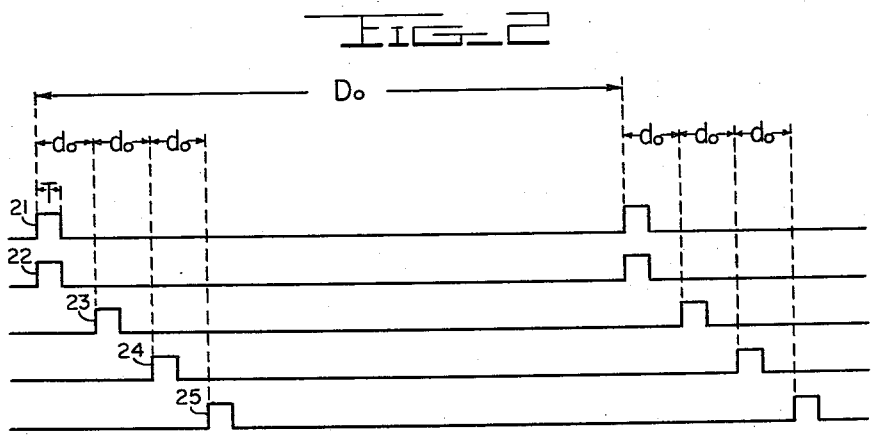
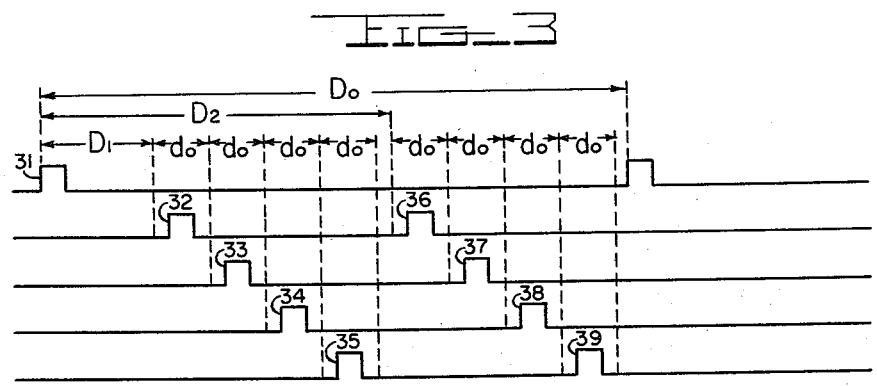
INVENTOR
ALAN H. RICH
John E. Holford, Agent
BY Richard C. Reed
ATTORNEY Dec. 31, 1963  A. H. RICH  3,116,472
MULTICHANNEL LOGERITHMIC INTEGRATING COMPUTER
Filed Jan. 31, 1961  3 Sheets-Sheet 2
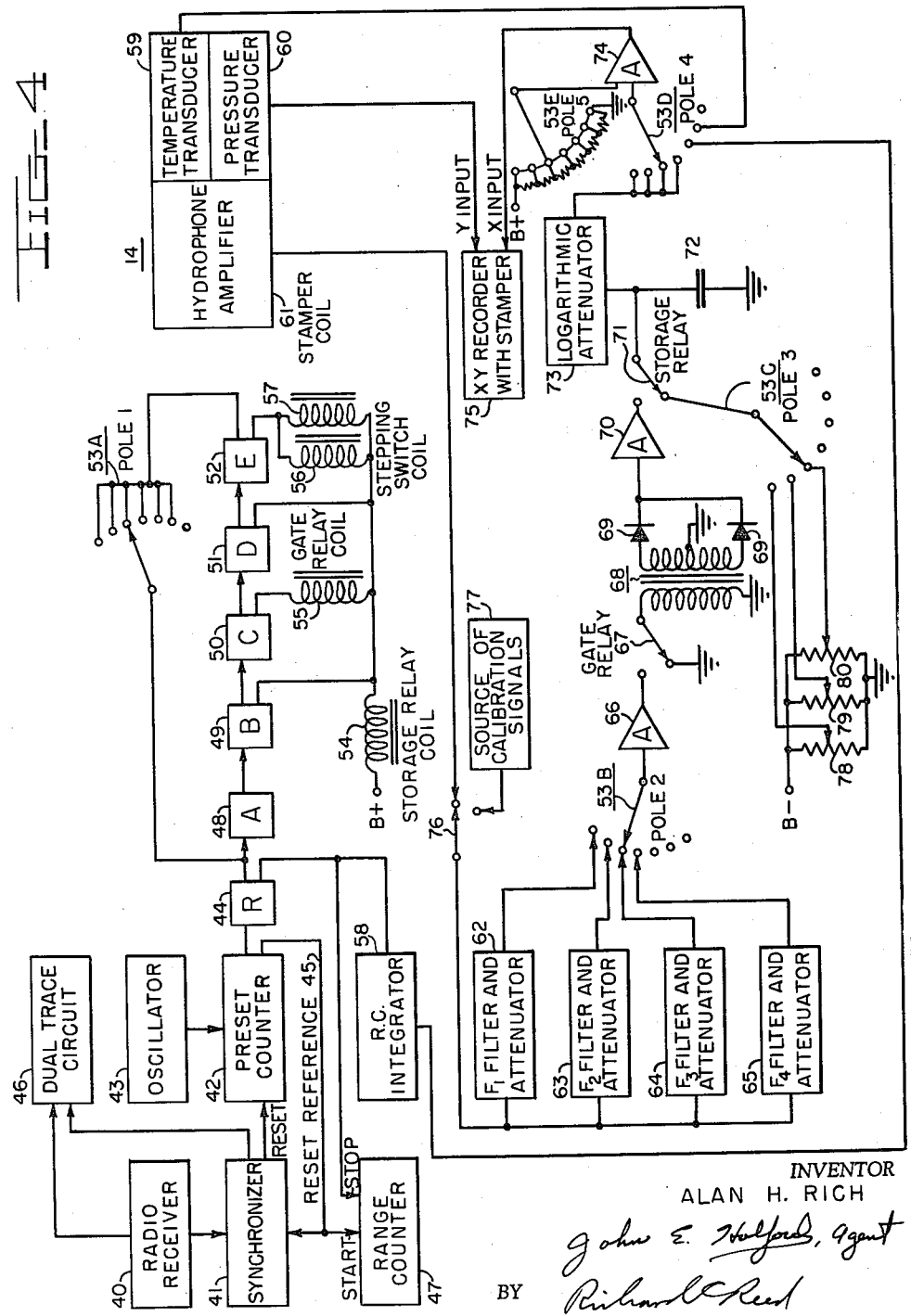
INVENTOR
ALAN H. RICH
BY
ATTORNEY Dec. 31, 1963   A. H. RICH   3,116,472
MULTICHANNEL LOGERITHMIC INTEGRATING COMPUTER
Filed Jan. 31, 1961   3 Sheets-Sheet 3
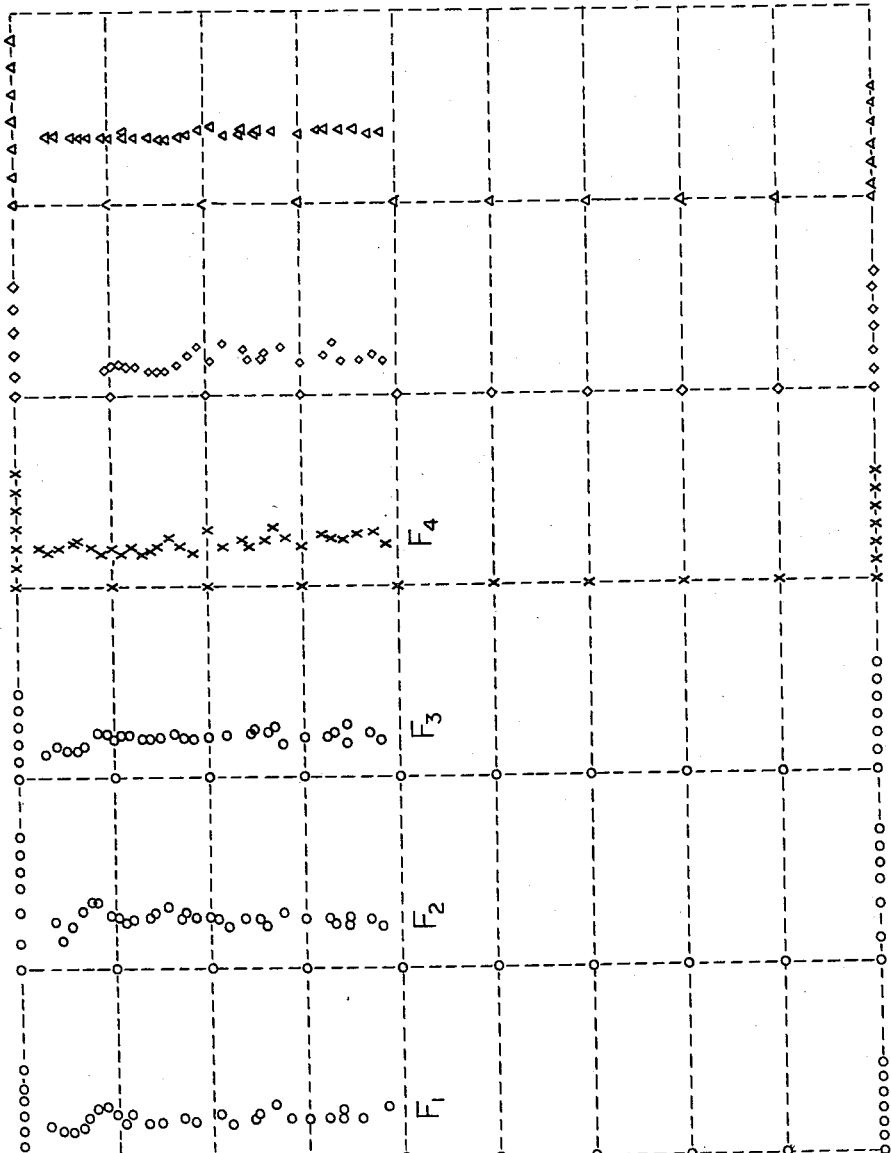
INVENTOR
ALAN H. RICH
BY
ATTORNEY United States Patent Office 3,116,472
Patented Dec. 31, 1963

3,116,472
MULTICHANNEL LOGARITHMIC INTEGRATING COMPUTER
Alan H. Rich, Washington, D.C., assignor to the United States of America as represented by the Secretary of the Navy
Filed Jan. 31, 1961, Ser. No. 86,261
3 Claims. (Cl. 340—5)

(Granted under Title 35, U.S. Code (1952), sec. 266)

The invention described herein may be manufactured and used by or for the Government of the United States of America for governmental purposes without the payment of any royalties thereon or therefor.

The present invention relates to systems for reducing and recording test data. More particularly it relates to a system for use in sonar tests where the transmitted data is frequency-vs.-time at standard amplitude and the received information desired is a compressed amplitude-vs.-hydrophone depth record at each frequency.

A standard sonar test procedure has been established wherein sonar signals at four frequencies are transmitted in a preselected sequence from a transmitting vessel to a distant hydrophone suspended from a receiving vessel. At the start of each pulse sequence a marker signal is transmitted between the two vessels over a radio link. The received signal amplitudes are all recorded as a function of time on a standard strip recorder. Additional information, such as temperature and pressure at the receiving hydrophone are also recorded on the same time base. During the test the depth of the hydrophone is varied to obtain further data.

While the above recording system is simple, it has several undesirable features. After all of the data is recorded it is converted to logarithmic power function relative to some suitable base, usually decibels above the power required to produce one microvolt output at the hydrophone. This conversion requires a logging rectifier circuit which is inherently inaccurate. Reading of amplitude records thus produced leads to human errors.

Another disadvantage lies in the fact that the data as recorded is too complicated for visual inspection. This means that any malfunction which occurs in the test equipment may go undetected throughout the test period. Also, if some unusual phenomenon is recorded, follow-up tests must await the discovery of the phenomenon during the subsequent data reduction process. Since each test procedure involves great expense and often is delayed by uncontrollable factors, such as weather conditions, a system which can both reduce and record incoming data for immediate use is highly desirable.

An object of the present invention is, therefore, to provide an apparatus which separates received sonar test signals according to frequency, reduces these signals to standard values, and as a function of at least one other coincident parameter.

Another object of the invention is to provide an apparatus of the type described above which also separates data from received signals of the same frequency transmitted simultaneously from a single source, but propagated by different sound paths.

These and other objects of the invention are best understood with reference to the accompanying drawing wherein:

FIG. 1 shows the relative position, with horizontal scale comprised of the test vessels and test equipment;

FIG. 2 shows the relative time position of the transmitted pulses;

FIG. 3 shows the relative time position of a typical series of received signals;

FIG. 4 shows a block diagram of the apparatus for reducing and recording the received signals; and FIG. 5 shows a recording of the signals made by the apparatus of FIG. 4.

As shown in FIG. 1 the first vessel 10 transmits test signals to a second vessel 11. To begin a test a pulse is transmitted over a radio link 12, and another pulse is generated by a sonar transducer 13 at a first frequency $f_1$. At equal testing intervals thereafter, sonar pulses are generated at frequencies $f_2$, $f_3$, and $f_4$. A sufficient quiescent interval is then provided for the propagation of echoes from the $f_1$ pulse to a point where they will not be masked by the next direct pulse at that frequency. At the end of the quiescent interval the entire sequence is repeated.

By standardizing the above procedure it has been possible to obtain more reliable data and better correlation of data from independent tests. The quiescent and test intervals remain constant for each test so that there is no ambiguity in the time delay or range of the signals, and the frequency sequence is fixed so that a detected pulse at one frequency will not be mistaken for another, even though the pulses in one path overlap those of another.

A pair of typical propagation paths 17 and 18 is illustrated in FIG. 1. Sound in path 17 is repeatedly refracted upward after it passes downward as far as level 15 and reflected back from the water surface 16. Path 18 having a somewhat greater slope as it leaves transducer 13 penetrates any existing thermocline and bounces back from the ocean floor 19. The path 17 being the shorter of the pair delivers its signals to the hydrophone sooner than path 18.

FIGS. 2 and 3 show the time positions of the transmitted and received signals respectively. As shown in FIG. 2 the radio pulse 21 and the first sonar pulse 22 coincide, and each successive sonar pulse 23–25 is delayed by $d_0$. A similar series of pulses occurs after a delay $D_0$. The former delay may be a fraction of a second while the latter may cover many seconds. As shown in FIG. 3 the received radio pulse 31 may be considered to occur simultaneously with pulse 21, while pulses 32–35 are received over the short path after a delay $D_1$ and pulses 36–39 arrive over the long path after a delay $D_2$.

These last delays are measured to the beginning of a series of intervals $d_0$ during which each of the sonar pulses are received. This is the same interval $d_0$ used in FIG. 2 and represent the exclusive intervals within which subsequent pulses can be expected to occur, allowing for slight differences between propagation delays for each of the different frequencies. The reason for so indicating these delays will become apparent when the apparatus of the invention is understood.

FIG. 4 shows the apparatus in block form and will hereafter be referred to as a logic circuit. The received input sonar signals for the logic circuit are supplied from the hydrophone amplifier section 61 of the hydrophone 14 which usually includes its own broadband amplifier. The hydrophone also includes two additional sections 59 and 60 which house temperature and pressure transducers the purpose of which will be explained presently.

The sonar signals pass through the switch 76 which is normally closed to a bank of filters and attenuators. Each filter selects the pulses at one of the frequencies $f_1$–$f_4$. If the signals are too weak for passive filters, tuned amplifiers may be used. The attenuators preferably have a stepped characteristic providing, for example, ten steps of 5 db each.

Prior to arrival of the sonar signals the radio signal is picked up by the receiver 40. This pulse is detected and after passing through the synchronizer 41 starts a preset counter 42 which is fed pulses from a clock oscillator 43. When the counter reaches a first count a pulse is emitted to trigger a monostable multivibrator 44 having an adjustable output pulse width R. At a higher count an output pulse is fed back to the synchronizer 41 and the "start" input of a range counter. The output of multivibrator 44 is connected to the "stop" input of the range counter.

The circuitry consists of conventional structures well known in the art. Any suitable radio receiver may be used. The synchonizer employs the usual logic circuits which select the radio pulse when present in preference to the feedback pulse. Oscillator 43 may be a crystal controlled sinusoidal generator or similar circuit. The preset counter is merely a conventional EPUT counter with two pulse circuits that trigger when a given count is reached. For example, relaxation circuits may be used so that a gas tube or zener diode breaks down when a sufficient voltage is stored across a capacitor by rectified pulses from oscillator 43. A dual trace strip recorder or cathode ray tube 46 may be used to observe the radio pulses and synchronizer output simultaneously while manually adjusting the preset count for the feedback circuit.

The preset count which triggers multivibrator 44 is adjusted to cover most of the delay anticipated between the arrival of the radio pulse and the first sonar pulse. The pulse width of multivibrator 44 is used as a fine delay to synchronize the subsequent processing circuits with the arrival of the sonar pulse. The trailing edge of this fine delay pulse stops the range counter at the operating range to which the unit is synchronized to permit a fairly close adjustment. As will become apparent, the processed data will indicate if further adjustment is necessary.

Monostable multivibrators 48–52 provide the required delays between the various processing functions which are performed on the incoming sonar signals. Multivibrator 48 supplies a fixed delay A which allows a short recovery time from a preceding step, to be discussed later. Multivibrator 49 supplies a fixed delay B from the time a storage gate relay coil 54 is energized until a signal relay coil 55 is energized by multivibrator 50. The fixed delay C provided by the latter governs the operating period of the coil 55. After this coil is deenergized, multivibrator 51 provides a fixed delay D to permit the remainder of the mechanical follow-up by an XY recorder. At the end of the delay period D multivibrator 52 generates a narrow pulse to energize a stamper coil 57 and a stepping switch coil 56.

This last named coil operates a multi-pole multi-throw stepping switch of which 53A represents one pole. The rotor of this pole closes the feedback path so that the trailing edge of the pulse from multivibrator 52 recycles the delay elements 48–52. This process is repeated until the stepping switch returns to the original tap which is not connected to multivibrator 52. The delay between steps is equal to or slightly less than $d_0$.

The effect of this sequence of events is observed in the circuitry to the right of the filters and attenuators 62–65, which shall be called the processing section. Each frequency is fed to a different tap of a second pole 53B of the stepping switch. During the first cycle of multivibrators 48–52 the $f_1$ tap is connected to the input of a voltage amplifier 66; during the second cycle the $f_2$ tap is connected, etc. When coil 55 is energized the normally open relay 67 closes, coupling the amplifier output to a full wave rectifier including transformer 68 and rectifiers 69.

The rectified signal is next coupled to a current amplifier 70 and an integrating circuit. The coupling to the integrating circuit is effected by storage relay 71 when coil 54 is energized. Prior to this the relay connects a tap of one of the potentiometers 78–80 to the integrator, capacitor 72. The R-C time constant of the potentiometer and capacitor 72 is small compared to the delay period A of multivibrator 48. Thus the capacitor discharges to the potentiometer bias voltage between processing cycles. This bias voltage is adjusted to compensate for the average noise level for each signal. A third pole 53C of the stepping switch connects the proper potentiometer for each cycle.

The signal then passes through a logarithmic attenuator 73, a differential amplifier and finally to the X input of the XY recorder. The logarithmic attenuator used was a "LOGATEN" Model CES 511E. Other types are also available commercially. Buffer amplifiers (not shown) may be used to isolate the various circuit components to prevent over-loading.

A fourth pole 53D of the stepping switch connects one input of the differential amplifier to the output of the logarithmic attenuator when sonar signals are processed. The remaining input of the differential amplifier is connected to a fifth pole of the stepping switch. The taps of the fifth pole are interconnected to form a voltage divider. Thus a new zero level is provided for each signal processed as it arrives at the recorder.

One of the remaining taps on the pole 53D may be used for the signal from the temperature transducer. This signal may be merely the voltage across a thermistor. Still another may be used for a range signal obtained, for example, by passing the variable width output pulse of multivibrator 44 through a simple RC integrating circuit.

At the beginning of each test the standard source 77 is used to calibrate and set the output levels of each filter. In order to calibrate, four standard signals at frequencies $f_1$–$f_4$ are provided and introduced by throwing the single-pole double throw switch 76. The attenuators are all set to their lowest values and increased one step after each radio pulse is received. When a record has been made of every step, the sonar signals are switched in and the settings of the attenuators reduced individually to obtain a convenient recording level for each frequency. The settings are then logged or a recording made with the standard signals again switched in. To indicate drift in the components of the processing circuit, a standard signal may be applied to one tap of pole 53B and the corresponding tap on pole 53D connected to those of the other frequency channels. The corresponding tap on pole 53C may be grounded.

The recorder 75 is a Moseley XY type model 2S with a 2D stamper. The stamper moves linearly with both the X and Y input voltages. The stamper has 6 characters which operate in sequence. The Y input is driven by the signal from pressure transducer 60. A typical pressure transducer includes a potentiometer driven by a Bourdon tube.

FIG. 5 shows a record of a test made by the XY recorder. The upper horizontal row of characters represents the standard level steps obtained with the standard signals by varying the input when the transducer was at minimum depth. The lower horizontal row was obtained in the same manner but at maximum depth. The straight vertical rows were stamped with the transducer at preselected depths and no sonar input signal. For convenience a preset voltage divider resistance circuit may be provided for depth calibration. Variations in the above structure are of course possible. Seven contacts are shown on the stepping switch, since this is the requirement for a six character stamper. A greater number of characters will provide an even more flexible device. The filter outputs may be connected to more than one tap on pole 53B, so as to record two pulses of the same frequency arriving by different propagation paths.

If the pulses from two paths overlap, it may be desirable to provide a second processing circuit using additional poles on the same stepping switch. Unused contacts are employed to measure temperature, etc., as before. Synchronization of the incoming pulses from the two paths for processing is obtained by varying the delay $d_0$, until some multiple thereof is substantially equal to the delay between the paths. The delay R in multivibrator may be used to compensate for small differences in the above delay criteria. Superposition of the gating functions and the incoming data is evident when observing the XY recorder.

Obviously many modifications and variations of the present invention are possible in the light of the above teachings. It is therefore to be understood that within the scope of the appended claims the invention may be practiced otherwise than as specifically described.

What is claimed is:

1. A data handling system for reducing and recording the amplitude of received pulses from a preselected sequence of transmitted sound pulses of different ferquencies, the first of which has been transmitted simultaneously with a radio marker pulse comprising, a timing circuit actuated by said radio pulse for producing a sequence of timing pulses, a multipole multitap stepping switch actuated by one of said timing pulses, all but one tap of a first common pole of said stepping switch being interconnected to the output of said timing circuit to receive the last of said timing pulses, said first common pole being connected to provide a feedback path to the input of said timing circuit, whereby said timing circuit is recycled automatically, a tuned receiver having separate output channels for separating said received sound pulses, each said channel containing only pulses having the same frequency, each of said channels being coupled exclusively to one tap of a second common pole on said stepping switch, a signal processing circuit coupled to said second common pole, and said processing circuit having a gated amplitude measurement circuit connected to the timing circuit and actuated by said timing pulses.

2. The data handling system according to claim 1 wherein said tuned receiver includes a hydrophone with a pressure transducer mounted thereon, and said processing circuit includes an XY recorder, the output of said processing circuit being connected to the X input of said XY recorder and the output of the pressure transducer to the Y input of said recorder.

3. The data handling system according to claim 1 wherein said processing circuit includes an input gate relay means for coupling the input of said processing circuit to said second stepping switch pole in response to an intermediate timing pulse, diode means serially disposed in said processing circuit to rectify signal current induced therein, an integrating capacitor, storage relay means actuated continuously by all but the first of said timing pulses to shunt said capacitor across said processing circuit, said storage relay normally connecting said capacitor to a third pole of said stepping switch, a low impedance source of potential connected to each of the taps of said third pole, said potential being equal in magnitude to the average value of the ambient noise in the corresponding frequency channel, an attenuator means coupled to said capacitor for logarithmically compressing the amplitude of the signal voltage across said capacitor, a recorder, and means coupling said recorder to the output of said attenuator means including a fourth pole of said stepping switch, the taps of said third pole corresponding to the different frequency channels being connected to the output of said attenuator means.

References Cited in the file of this patent
UNITED STATES PATENTS

| | | |
|---|---|---|
| 2,635,228 | Purington | Apr. 14, 1953 |
| 2,712,128 | Woodruff | June 28, 1955 |
| 2,784,393 | Schultheis | Mar. 5, 1957 |